United States Patent
Niwa et al.

(10) Patent No.: US 8,736,215 B2
(45) Date of Patent: May 27, 2014

(54) MOTOR DRIVE DEVICE HAVING FUNCTION OF VARYING DC LINK LOW-VOLTAGE ALARM DETECTION LEVEL

(71) Applicant: FANUC Corporation, Yamanashi (JP)

(72) Inventors: Masakazu Niwa, Yamanashi (JP); Koujirou Sakai, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/803,805

(22) Filed: Mar. 14, 2013

(65) Prior Publication Data
US 2013/0264986 A1    Oct. 10, 2013

(30) Foreign Application Priority Data
Apr. 5, 2012  (JP) ................................. 2012-086741

(51) Int. Cl.
  *H02P 3/00*   (2006.01)
  *H02P 27/00*  (2006.01)
  *H02P 25/00*  (2006.01)

(52) U.S. Cl.
  USPC ........ 318/479; 318/400.3; 318/490; 318/494; 318/758; 318/812

(58) Field of Classification Search
  USPC ............... 318/479, 758, 812, 400.3, 490, 494
  See application file for complete search history.

(56) References Cited

U.S. PATENT DOCUMENTS

| | | | | | |
|---|---|---|---|---|---|
| 4,678,063 | A | * | 7/1987 | Kitaoka et al. | 187/296 |
| 4,962,354 | A | * | 10/1990 | Visser et al. | 323/360 |
| 5,070,290 | A | * | 12/1991 | Iwasa et al. | 318/758 |
| 6,804,127 | B2 | * | 10/2004 | Zhou | 363/37 |
| 2007/0182361 | A1 | * | 8/2007 | Pande et al. | 318/812 |
| 2011/0238338 | A1 | * | 9/2011 | Iwashita et al. | 702/58 |
| 2012/0068636 | A1 | * | 3/2012 | Iwashita et al. | 318/376 |

FOREIGN PATENT DOCUMENTS

| | | |
|---|---|---|
| JP | 2008-128897 A | 6/2008 |
| JP | 2010-130741 | 6/2010 |
| JP | 2011-087378 | 4/2011 |

* cited by examiner

*Primary Examiner* — Eduardo Colon Santana
*Assistant Examiner* — Gabriel Agared
(74) *Attorney, Agent, or Firm* — Drinker Biddle & Reath LLP

(57) ABSTRACT

A motor drive device (1) of the present invention includes a converter unit (10) and an inverter unit (30). The converter unit (10) includes: power supply voltage monitoring unit (3) for detecting a power failure; DC link voltage detecting means (4); capacitor total capacity calculating means (6) which calculates total capacity of DC link smoothing capacitors (17, 18) and calculates a DC link low-voltage alarm detection level for an instantaneous power failure; DC link low-voltage alarm detection level setting means (8) which varies the DC link low-voltage alarm detection level for an instantaneous power failure as necessary; and alarm generating means (7) which monitors the DC link voltage and generates an alarm to protect the converter unit. In the case where a power failure is detected, the DC link low-voltage alarm detection level is increased in accordance with the total capacity of the DC link smoothing capacitors (17, 18).

4 Claims, 11 Drawing Sheets

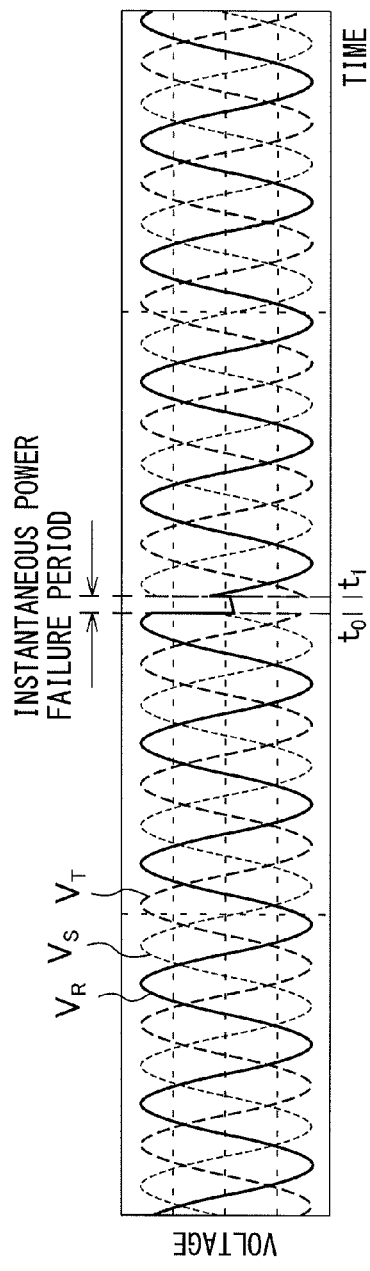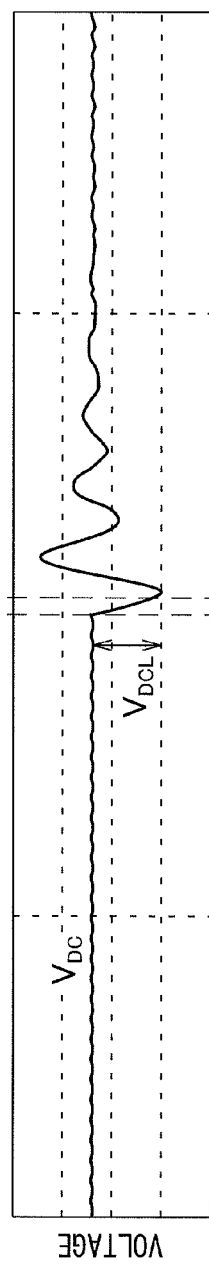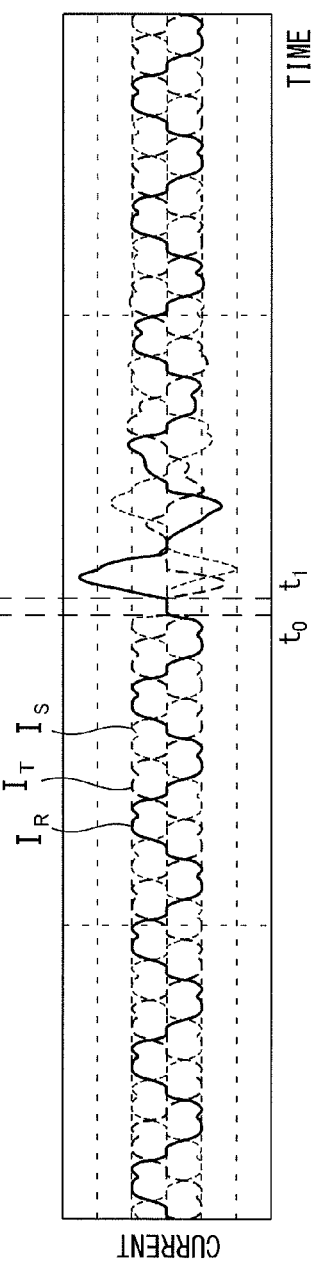

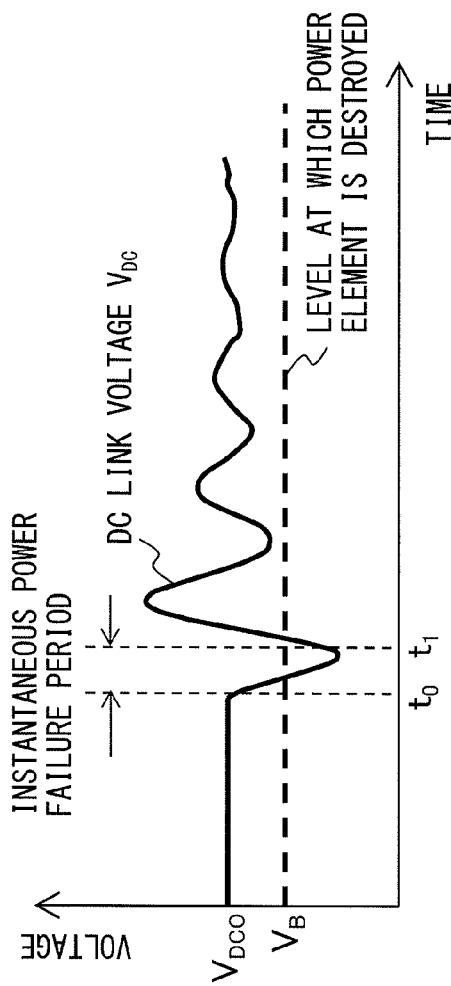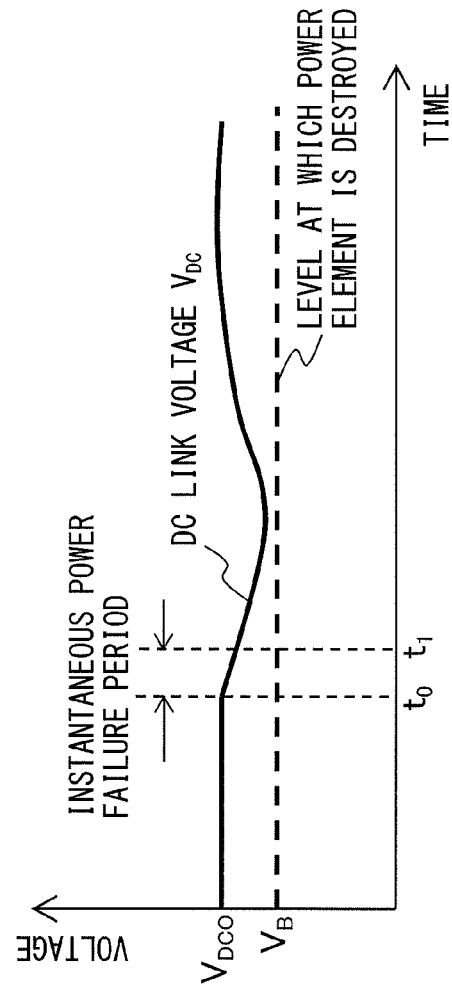
FIG. 4A
FIG. 4B

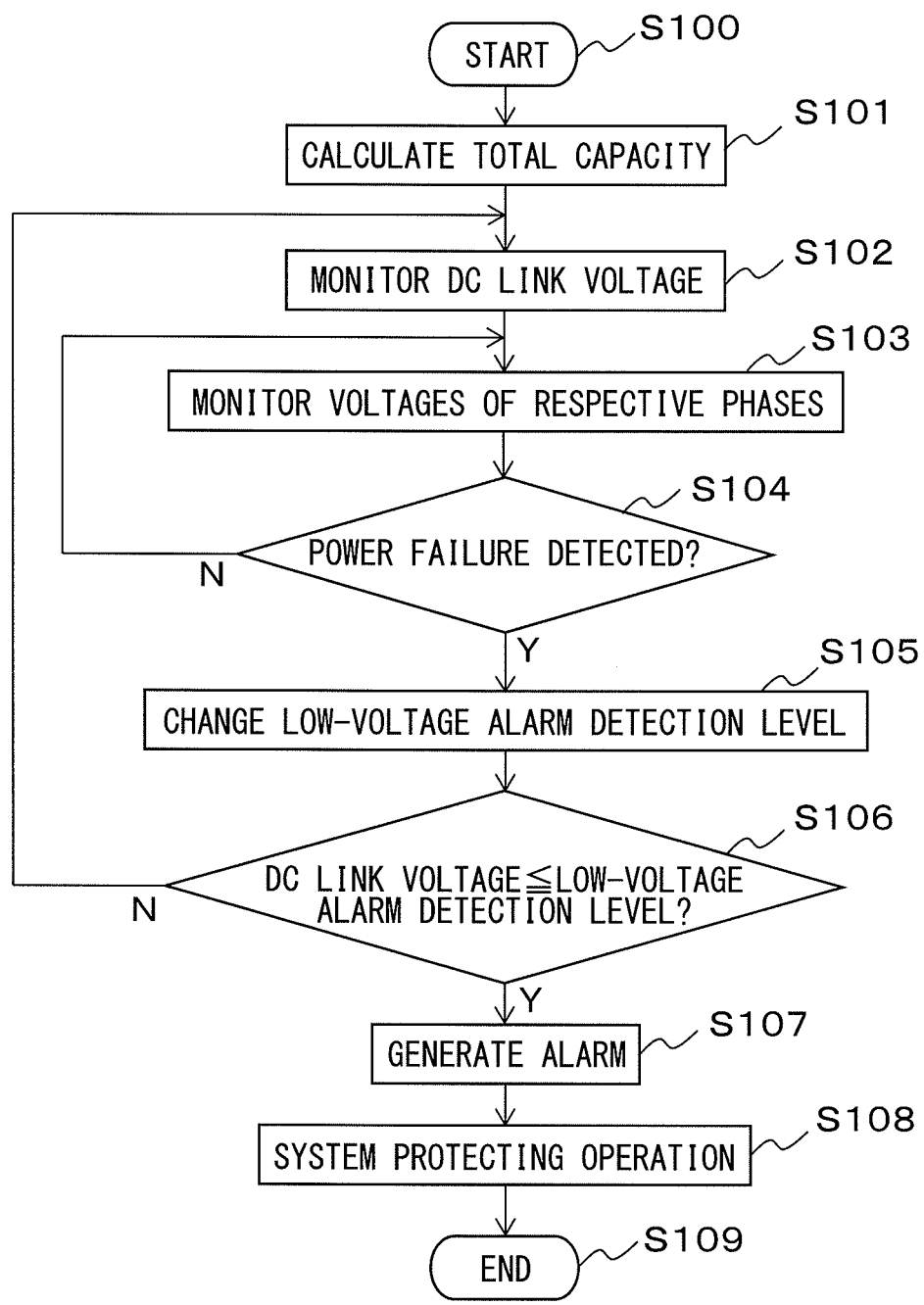

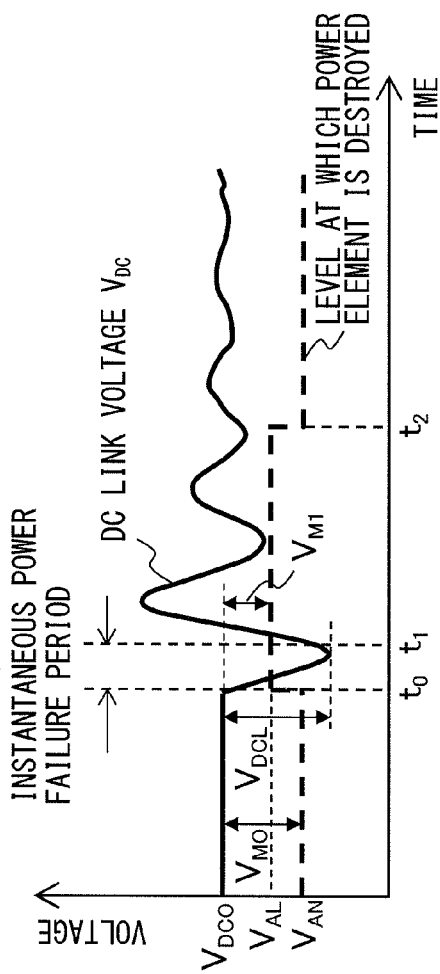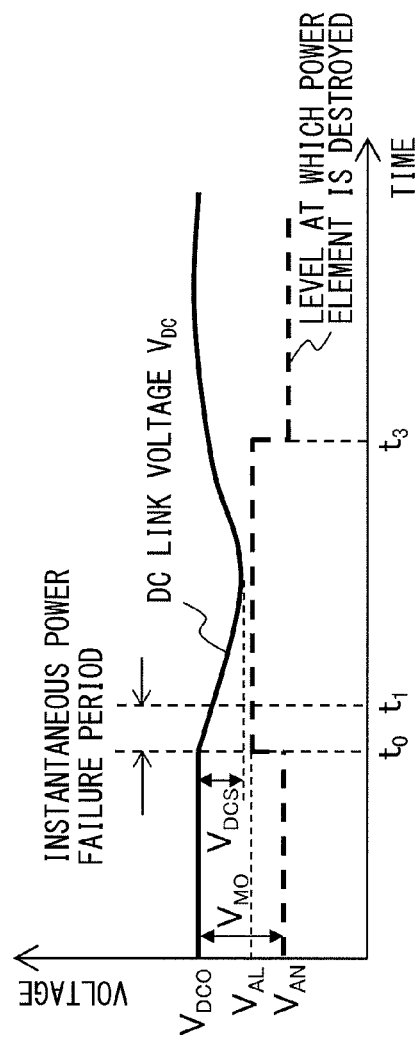

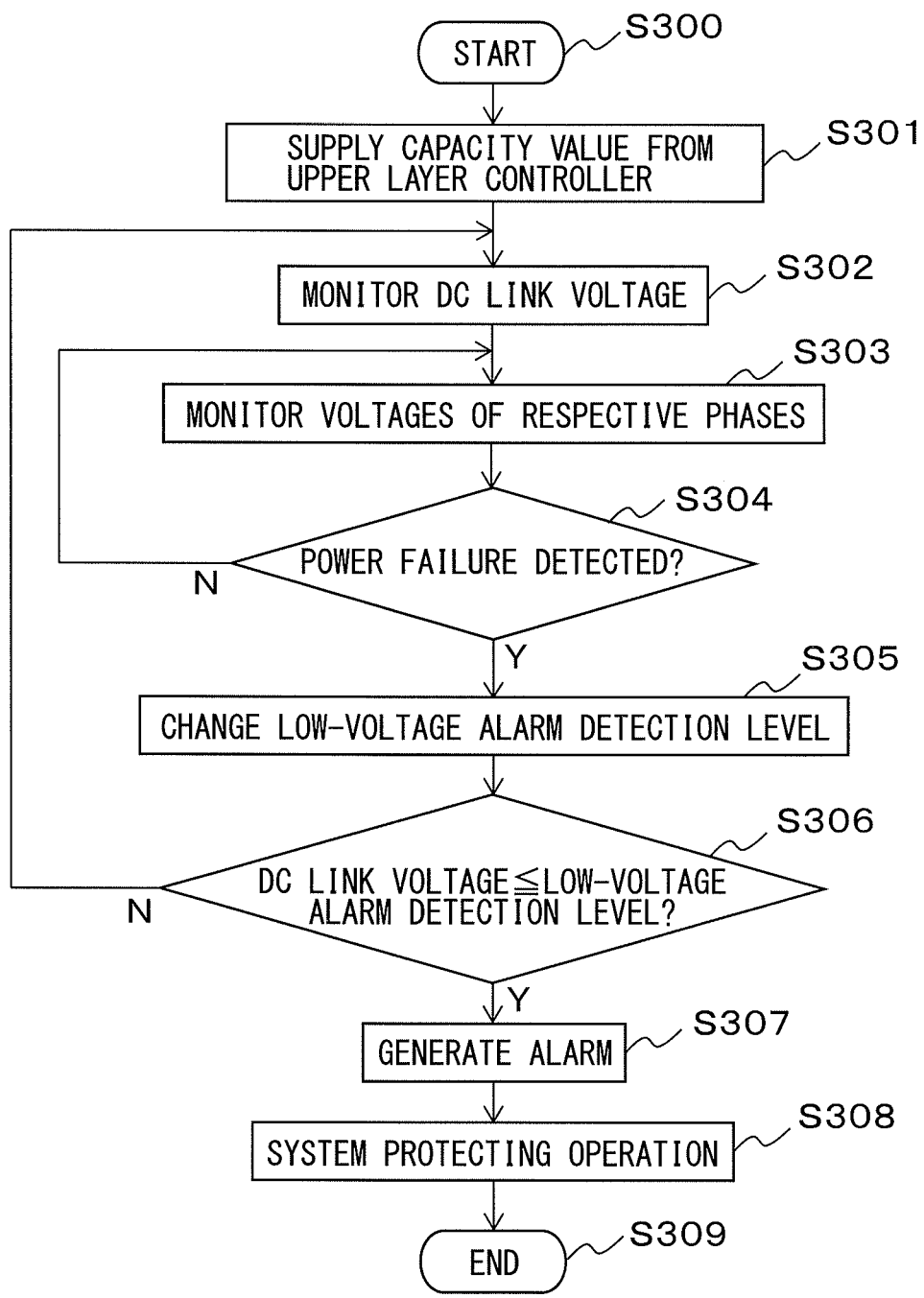

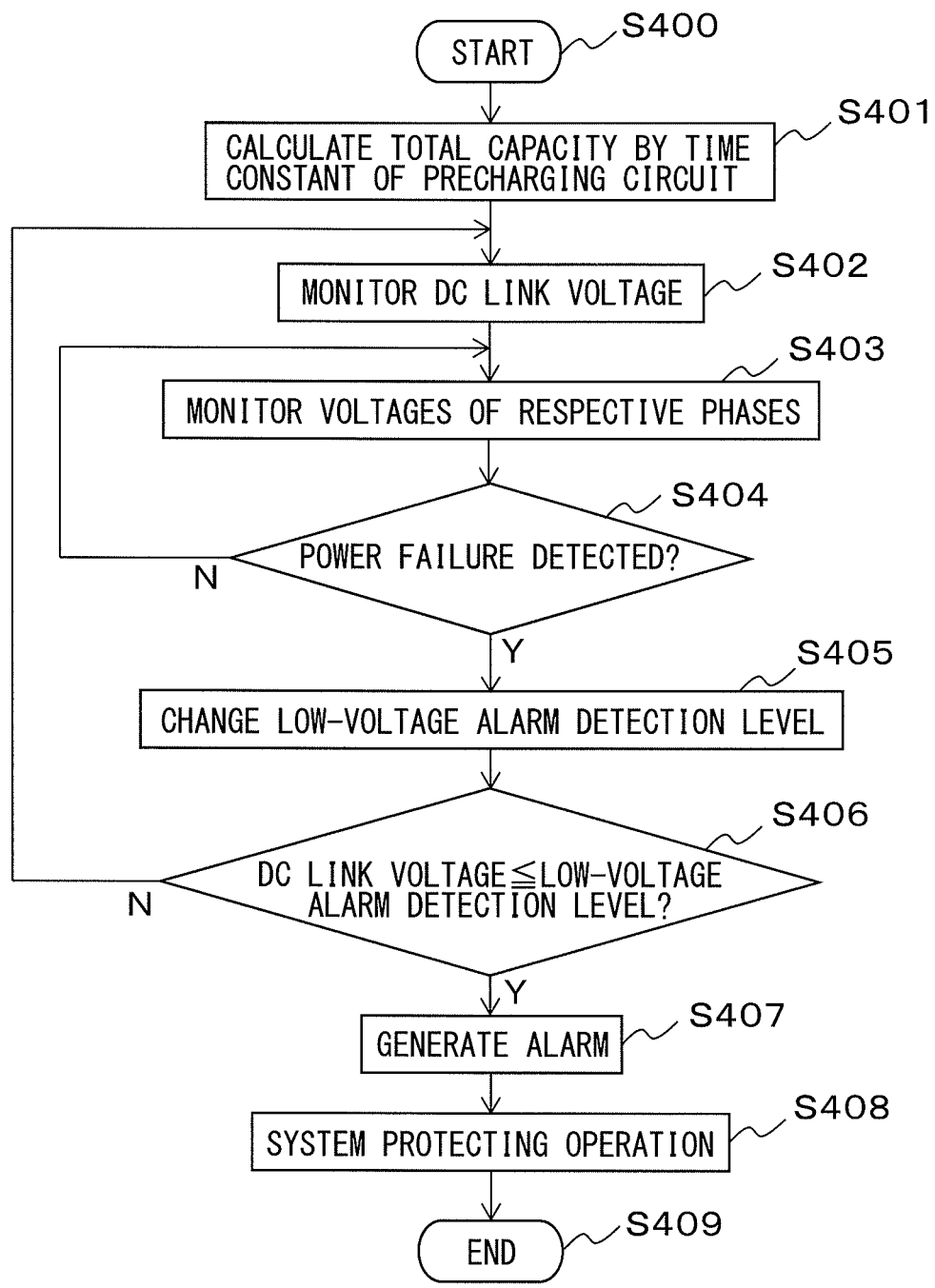

MOTOR DRIVE DEVICE HAVING FUNCTION OF VARYING DC LINK LOW-VOLTAGE ALARM DETECTION LEVEL

This application is a new U.S. patent application that claims benefit of JP 2012-086741, filed on Apr. 5, 2012, the content of JP 2012-086741 is incorporated herein by reference.

FIELD OF THE INVENTION

The present invention relates to a motor drive device and, more particularly, to a motor drive device including a converter supplying DC power from a three-phase AC power supply and an inverter supplying variable-frequency three-phase AC power from DC power supply.

BACKGROUND OF THE INVENTION

A drive device which drives a motor or the like by converting commercial three-phase AC power to DC power is known. It is important for such a drive device to accurately detect occurrence of instantaneous power failure in order to safely operate equipment in the case where power failure of an AC power supply occurs. A power supply device for detecting instantaneous power failure of an AC power supply is known (for example, Patent literature 1: JP-A-2008-128897).

FIG. 1 illustrates a conventional motor drive device. A conventional motor drive device 100 has an AC power supply 101 and a DC power supply circuit 103 for converting three-phase AC voltages $V_R$, $V_S$ and $V_T$ from an AC power supply 101 to DC voltages. The DC power supply circuit 103 has a converter 102 for converting the AC voltages received from the AC power supply 101 to DC voltages, an inverter 107 for converting the DC voltages to AC voltages, and a DC link smoothing capacitor 104 for smoothing the waveform of the DC voltage. The DC power which is output from the converter 102 is supplied to the inverter 107 via DC power supply lines 105 and 106, and a motor 113 is driven by AC power which is output from the inverter 107.

The motor drive device 100 has an instantaneous power failure detection circuit 108 for detecting an instantaneous power failure. The instantaneous power failure detection circuit 108 has a level converting circuit 109 and a control unit 110. The level converting circuit 109 converts all of the three-phase AC voltages $V_R$, $V_S$ and $V_T$ to a level which can be measured by the control unit 110. The control unit 110 detects whether an instantaneous power failure occurs or not on the basis of AC voltage converted by the level converting circuit 109 and, in the case where an instantaneous power failure is detected, outputs an instantaneous power failure detection signal 111. With such a configuration, the conventional motor drive device 100 detects an instantaneous power failure. Patent literature 1 discloses a technique of detecting an instantaneous power failure of an AC power supply on the input side in a DC power supply circuit which performs AC/DC conversion. In Patent literature 1, however, protection of a power element in a converter from a damage and maintenance of continuous operation are not described.

When an instantaneous power failure occurs, DC link voltage $V_{DC}$ which is the voltage between the terminals of the DC link smoothing capacitor 104 decreases and the power is recovered from the power failure, current called inrush current flows in the DC link smoothing capacitor 104. In this case, the larger the decrease amount of the DC link voltage is and the larger the total capacity of the DC link smoothing capacitor 104 and a DC link smoothing capacitor 112 is, the larger the inrush current is.

With reference to FIGS. 2A to 2C and FIGS. 3A to 3C, the relation between the decrease amount of the DC link voltage and inrush current will be described. FIGS. 2A, 2B, and 2C illustrate changes with time of AC voltage, DC link voltage, and alternating current, respectively, in the case where the decrease amount of the DC link voltage is large. FIGS. 3A, 3B, and 3C illustrate changes with time of AC voltage, DC link voltage, and alternating current, respectively, in the case where the decrease amount of the DC link voltage is small. In the cases of FIGS. 2A to 2C and FIGS. 3A to 3C, it is assumed that the capacities of the DC link smoothing capacitors are the same respectively.

FIG. 2A illustrate changes with time of AC voltages $V_R$, $V_S$ and $V_T$. It is assumed that a power failure occurs at time $t_0$ and the power supply recovers from the power failure at time $t_1$. In the period from the time $t_0$ to the time $t_1$ [s] as an instantaneous power failure period, the AC voltages $V_R$, $V_S$ and $V_T$ are 0[V].

FIG. 2B illustrate changes with time of the DC link voltage $V_{DC}$ [V]. It is understood that the DC link voltage $V_{DC}$ is substantially constant until time $t_0$ and starts decreasing from the time $t_0$ at which an instantaneous power failure occurs. After the power supply recovers at time $t_1$, the DC link voltage $V_{DC}$ starts increasing and, after that, repeats increasing/decreasing (ringing) for a predetermined period, and is converged to a predetermined value.

FIG. 2C illustrate changes with time of alternating currents $I_R$, $I_S$ and $I_T$. In the period from the time $t_0$ to the time $t_1$ [s] as an instantaneous power failure period, the alternating currents $I_R$, $I_S$ and $I_T$ are 0[A]. After the power supply recovers at time $t_1$, inrush current flows. As an element in the converter unit, a power element having resistance to large current has to be used so that the device is not influenced even in the case where the inrush current occurs. In particular, in the IEC (International Electrotechnical Commission) 60204-1 standard, it is requested that equipment operates safely even in the case where instantaneous power failure in an AC power supply continues for 3 [ms] at the maximum. Therefore, it is desirable that the converter operates normally even in the case where the power supply recovers from an instantaneous power failure in an AC power supply after 3 [ms] since the start of the power failure.

Next, description will be made for the relation between the decrease amount of the DC link voltage and inrush current in the case where the decrease amount of the DC link voltage $V_{DC}$ is smaller than that in FIGS. 2A, 2B and 2C. FIG. 3A illustrates changes with time of AC voltages $V_R$, $V_S$ and $V_T$. It is assumed that a power failure occurs at time $t_0$ and the power supply recovers from the power failure at time $t_1$. In a manner similar to FIG. 2A, in the period from the time $t_0$ to the time $t_1$ [s] as an instantaneous power failure period, the AC voltages $V_R$, $V_S$ and $V_T$ are 0[V].

FIG. 3B illustrate changes with time of the DC link voltage $V_{DC}$ [V]. The DC link voltage $V_{DC}$ is substantially constant until time $t_0$, starts decreasing from the time $t_0$ at which an instantaneous power failure occurs and, after that, is converged to a predetermined value.

FIG. 3C illustrate changes with time of alternating currents $I_R$, $I_S$ and $I_T$. In the period from the time $t_0$ to the time $t_1$ [s] as an instantaneous power failure period, the alternating currents $I_R$, $I_S$ and $I_T$ are 0[A]. After the power supply recovers at time $t_1$, inrush current flows. However, the intensity of the inrush current is smaller than that in the case of FIG. 2C. In such a manner, the intensity of the inrush current which occurs at the time of an instantaneous power failure largely fluctuates according to the decrease amount of the DC link voltage. The intensity I of the inrush current can be expressed as $I=C\times(dV_{DC}/dt)$ using time rate of change $dV_{DC}/dt$ of the decrease amount of the DC link voltage and the capacity C of the DC link smoothing capacitor.

Subsequently, fluctuation in the DC link voltage $V_{DC}$ in the case where an instantaneous power failure occurs will be described. FIGS. 4A and 4B are diagrams illustrating the relation between the DC link voltage $V_{DC}$ and the level at which the power element may be destroyed, to determine whether the decrease amount of the DC link voltage $V_{DC}$ lies in a predetermined range or not with respect to both of the case where the decrease amount of the DC link voltage $V_{DC}$ is large and the case where the decrease amount of the DC link voltage $V_{DC}$ is small. The level at which the power element may be destroyed denotes a voltage level at which the power element in the converter unit may be destroyed by inrush current which is caused by decrease in the DC link voltage $V_{DC}$. In the case where the DC link voltage $V_{DC}$ becomes equal to or lower than the level at which the power element may be destroyed, in order to prevent flow of the inrush current by which the power element may be destroyed, an alarm is generated. In such a manner, destruction of the power element due to the inrush current caused by decrease in the DC link voltage $V_{DC}$ can be suppressed.

FIG. 4A illustrate changes with time of the DC link voltage in the case where the decrease amount of the DC link voltage is large. FIG. 4B illustrate changes with time of the DC link voltage in the case where the decrease amount of the DC link voltage is small. In the case where the decrease amount of the DC link voltage $V_{DC}$ is large, as illustrated in FIG. 4A, when it is assumed that a power failure occurs in the period from the time $t_0$ to the time $t_1$, the DC link voltage $V_{DC}$ after the power failure becomes lower than a DC link voltage $V_{DC0}$ before the instantaneous power failure. It is understood that the DC link voltage $V_{DC}$ falls below a level $V_B$ at which the power element may be destroyed by the inrush current after the time $t_0$ and the power element may be destroyed.

In the case where the decrease amount of the DC link voltage $V_{DC}$ is small, as illustrated in FIG. 4B, when it is assumed that a power failure occurs in the period from the time $t_0$ to the time $t_1$, after the power failure, the DC link voltage $V_{DC}$ becomes lower than the DC link voltage $V_{DC0}$ before the instantaneous power failure. It is understood that the DC link voltage $V_{DC}$ does not become below the level $V_B$ at which the power element may be destroyed by the inrush current, and there is no possibility that the power element is destroyed.

As described, in the case where the DC link voltage decreases at the time of an instantaneous power failure, when the power supply recovers, inrush current flows from the power supply toward the DC link. It is necessary to prevent a power element as a component of the converter unit from being influenced by the inrush current at the time of an instantaneous power failure. Generally, a power element for rectification having sufficient resistance is used for the converter unit so as not to be damaged by the inrush current. The inrush current becomes large when the capacity of a DC link smoothing capacitor is large and the DC link voltage decreases at the time of an instantaneous power failure. Consequently, in consideration of the worst conditions, an element having an excessive margin in normal operation has to be selected as a power element for rectification. In addition, in recent years, axes are becoming multiple, the capacity of DC link smoothing capacitors is increasing by parallel connection of units, and it is becoming difficult to select a power element having an excessive margin.

Patent Literature 1: JP-A-2008-128897

An object of the present invention is to provide a motor drive device capable of selecting a proper power element by making a protection level variable so that the power element is not destroyed by inrush current after recovery from an instantaneous power failure while satisfying a condition of operation continuation of a converter, which is equal to or longer than 3 [ms] of an instantaneous power failure as requested in IEC60204-1.

SUMMARY OF THE INVENTION

An embodiment of the present invention relates to a motor drive device including a converter unit for converting AC power of an AC power supply to DC power and an inverter unit for converting the DC power converted by the converter unit to variable-frequency AC power, wherein the converter unit includes: a power supply voltage monitoring unit for monitoring voltages of respective phases of the AC power supply to detect a power failure; DC link voltage detecting means which detects low voltage by monitoring DC link voltage; capacitor total capacity calculating means which calculates total capacity of DC link smoothing capacitors provided for the converter unit and the inverter unit and calculates a DC link low-voltage alarm detection level for an instantaneous power failure; DC link low-voltage alarm detection level (LV level) setting means which varies the DC link low-voltage alarm detection level for an instantaneous power failure as necessary; and alarm generating means which monitors the DC link voltage and, in the case where the DC link voltage falls below the DC link low-voltage alarm detection level, generates an alarm to protect the converter unit, and wherein when the power supply voltage monitoring unit of the AC power supply detects the power failure, the DC link low-voltage alarm detection level is increased in accordance with the total capacity of the DC link smoothing capacitors.

In the motor drive device, the protection level is made variable so as not to destroy the power element by inrush current after recovery from an instantaneous power failure while satisfying a condition of operation continuation of a converter, which is equal to or longer than 3 [ms] of an instantaneous power failure as requested in IEC60204-1. In such a manner, the motor drive device capable of selecting a proper power element can be provided.

Further, by the function of making the DC link low-voltage alarm detection level variable, a low-voltage alarm detection level in normal time can be decreased. Consequently, an effect of suppressing occurrence of a low-voltage alarm due to erroneous operation in normal operation is also expected.

DESCRIPTION OF THE DRAWINGS

These and other features and advantages of the present invention will be better understood by reading the following detailed description, taken together with the drawings wherein:

FIG. 2A is a diagram illustrating changes with time in AC voltage when an instantaneous power failure occurs in the case where a decrease amount of DC link voltage is large;

FIG. 2B is a diagram illustrating changes with time in DC link voltage when an instantaneous power failure occurs in the case where a decrease amount of DC link voltage is large;

FIG. 2C is a diagram illustrating changes with time in alternating current when an instantaneous power failure occurs in the case where a decrease amount of DC link voltage is large;

FIG. 4A is a diagram illustrating the relation between DC link voltage and a voltage level at which a power element may be destroyed when an instantaneous power failure occurs in the case where a decrease amount of the DC link voltage $V_{DC}$ is large;

FIG. 4B is a diagram illustrating the relation between DC link voltage and a voltage level at which a power element may be destroyed when an instantaneous power failure occurs in the case where a decrease amount of the DC link voltage $V_{DC}$ is small;

FIG. 6 is a flowchart illustrating the operation procedure of the motor drive device according to the first embodiment;

FIG. 7A is a diagram illustrating the relation between DC link voltage and a DC link low-voltage alarm detection level when an instantaneous power failure occurs in the case where a decrease amount of the DC link voltage $V_{DC}$ is large in the motor drive device according to the first embodiment;

FIG. 7B is a diagram illustrating the relation between DC link voltage and a DC link low-voltage alarm detection level when an instantaneous power failure occurs in the case where a decrease amount of the DC link voltage $V_{DC}$ is small in the motor drive device according to the first embodiment;

FIG. 10 is a flowchart illustrating the operation procedure of the motor drive device according to the third embodiment; and FIG. 11 is a flowchart illustrating the operation procedure of a motor drive device according to a fourth embodiment.

DETAILED DESCRIPTION OF THE PREFERRED EMBODIMENTS

Hereinafter, a motor drive device according to embodiments of the present invention will be described with reference to the drawings. It is to be noted that the technical scope of the present invention is not limited to embodiments of the invention but includes the invention described in the scope of claims and its equivalents.

First Embodiment

Figure 1:
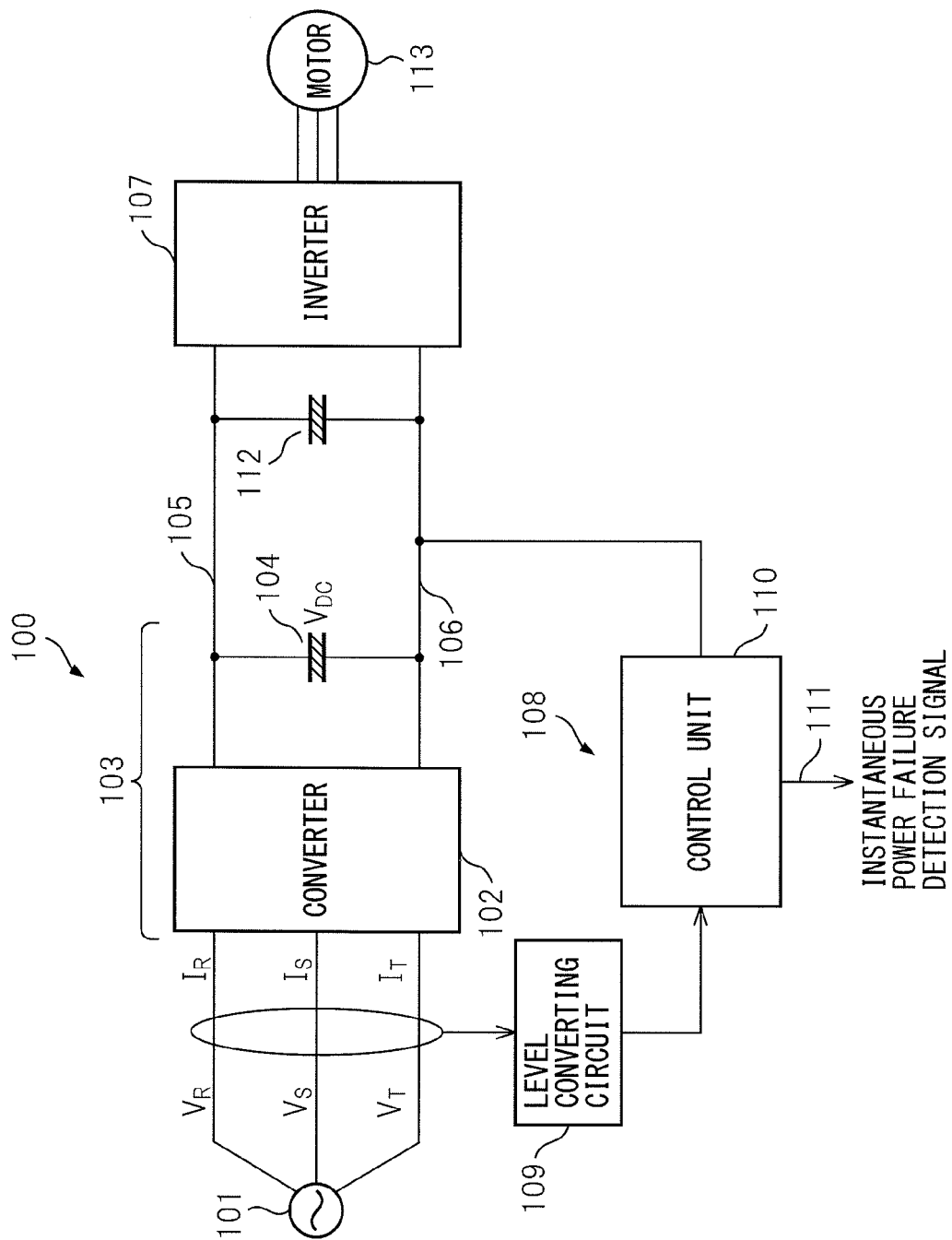
FIG. 1 is a diagram illustrating the configuration of a conventional motor drive device.
Figure 3A:
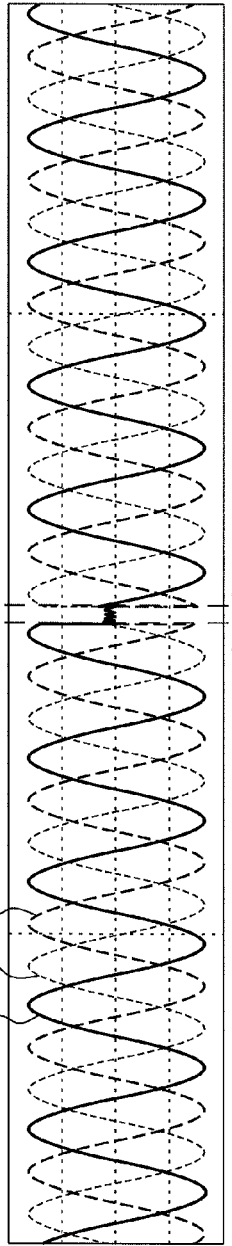
FIG. 3A is a diagram illustrating changes with time in AC voltage when an instantaneous power failure occurs in the case where a decrease amount of DC link voltage is small.
Figure 3B:
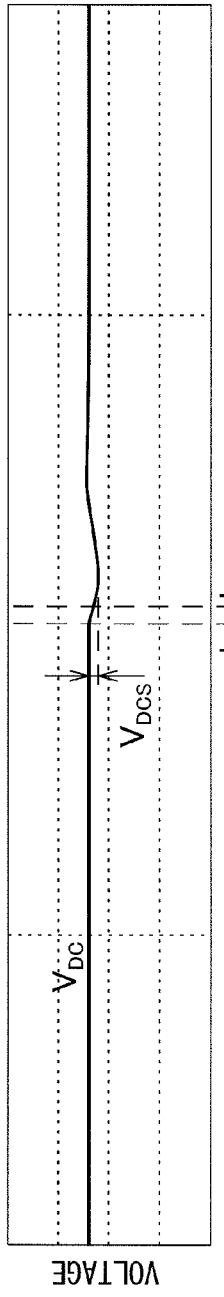
FIG. 3B is a diagram illustrating changes with time in DC link voltage when an instantaneous power failure occurs in the case where a decrease amount of DC link voltage is small.
Figure 3C:
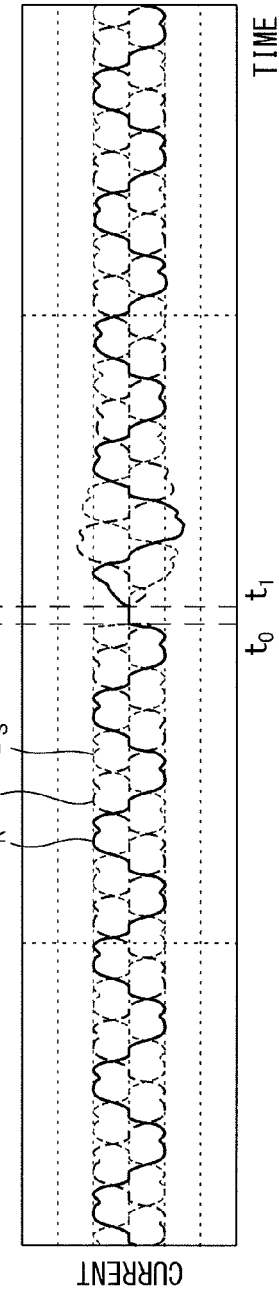
FIG. 3C is a diagram illustrating changes with time in alternating current when an instantaneous power failure occurs in the case where a decrease amount of DC link voltage is small.
Figure 5:
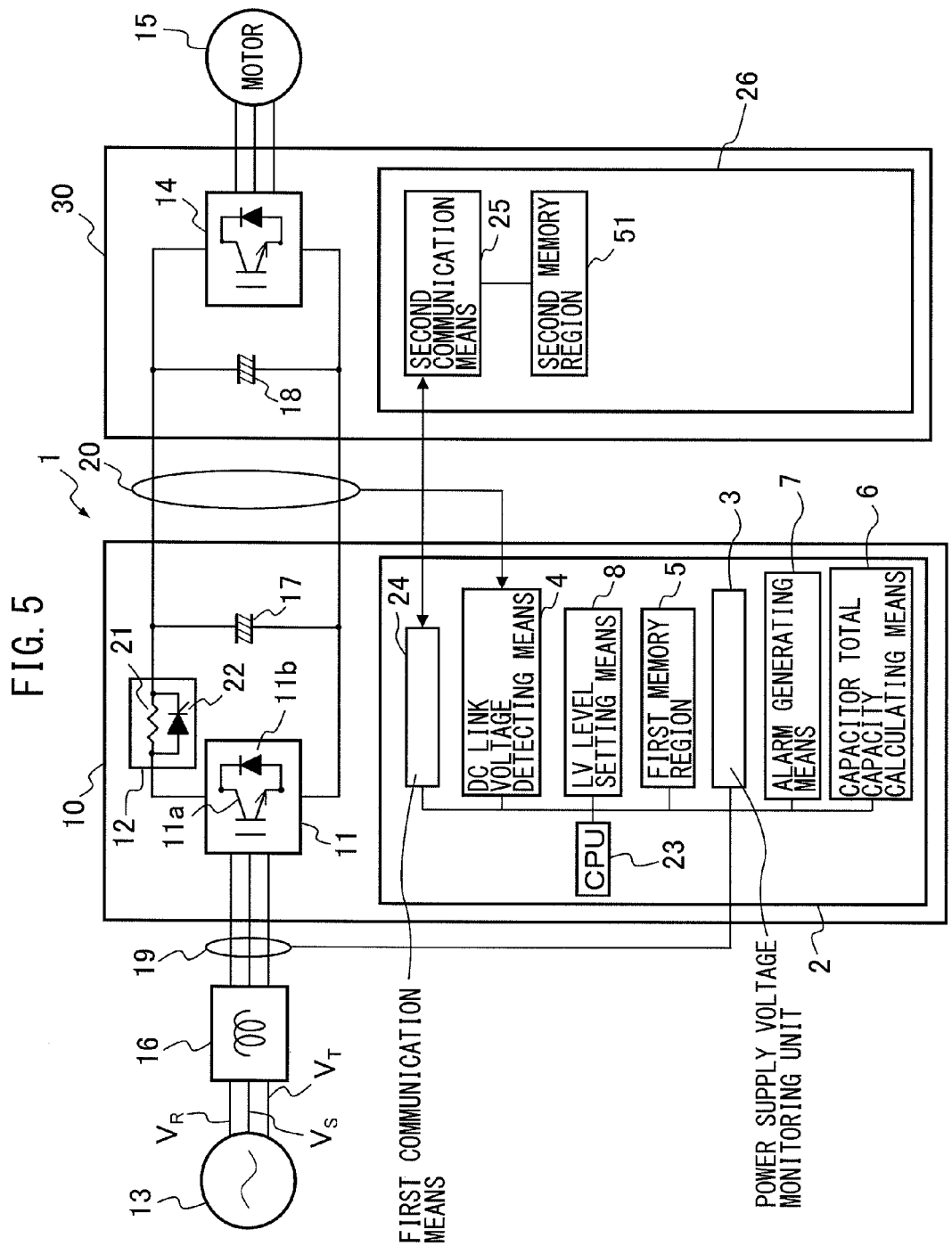
FIG. 5 is a diagram illustrating the configuration of a motor drive device according to a first embodiment.

FIG. 5 is a diagram illustrating the configuration of a motor drive device according to a first embodiment. A motor drive device 1 includes a converter unit 10 for converting AC power of an AC power supply 13 to DC power and an inverter unit 30 for converting the DC power obtained by the converter unit 10 to variable-frequency AC power. The converter unit 10 includes: a power supply voltage monitoring unit 3 for monitoring voltages of respective phases of the AC power supply 13 to detect a power failure; DC link voltage detecting means 4 which detects low voltage by monitoring DC link voltage; capacitor total capacity calculating means 6 which calculates total capacity of DC link smoothing capacitors (17 and 18) provided for the converter unit 10 and the inverter unit 30; DC link low-voltage alarm detection level (LV level) setting means 8 which varies a DC link low-voltage alarm detection level for an instantaneous power failure as necessary; and alarm generating means 7 which monitors the DC link voltage and, in the case where the DC link voltage falls below the DC link low-voltage alarm detection level, generates an alarm to protect the converter unit 10. When the power supply voltage monitoring unit 3 of the AC power supply detects the power failure, the DC link low-voltage alarm detection level is increased in accordance with the total capacity of the DC link smoothing capacitors (17 and 18).

The AC power supply 13 supplies three-phase AC voltages $V_R$, $V_S$, and $V_T$ to the converter unit 10 via a reactor 16. The AC voltages supplied to the converter unit 10 are converted to a DC voltage by an AC-DC converting circuit 11. The waveform of the DC voltage is smoothed by the first and second DC link smoothing capacitors 17 and 18. The converter unit 10 has the AC-DC converting circuit 11. The AC-DC converting circuit 11 has a power element 11a (such as a transistor) and a diode 11b. The DC power is supplied to the inverter unit 30 connected to the converter unit 10 and converted to AC power having frequency which is different from the frequency of the AC power supply 13 by a DC-AC converting circuit 14 and, after that, the AC power is supplied to a motor 15. In such a manner, the AC power supplied from the AC power supply 13 is supplied to the motor 15 via the converter unit 10 and the inverter unit 30, and the motor 15 is driven.

The motor drive device 1 according to the first embodiment has, in the converter unit 10, a first control circuit 2. The first control circuit 2 detects a power failure in the AC power supply 13, monitors DC link voltage in a DC link voltage measuring unit 20 in the converter unit 10 and, when the DC link voltage becomes equal to or less than a predetermined value, generates an alarm. The first control circuit 2 has the power supply voltage monitoring unit 3, the DC link voltage detecting means 4, a first memory region 5, the capacitor total capacity calculating means 6, the alarm generating means 7, the DC link low-voltage alarm detection level (LV level) setting means 8, first communication means 24, and a CPU 23 controlling those components.

Further, the motor drive device 1 of the first embodiment has, in the inverter unit 30, a second control circuit 26. The second control circuit 26 has a second memory region 51 and second communication means 25.

The power supply voltage monitoring unit 3 measures voltage supplied to the converter unit 10 in an AC voltage measuring unit 19 to detect whether a power failure occurs or not. In the case where a power failure is detected, the power supply voltage monitoring unit 3 transmits a power failure detection signal to the CPU 23.

The DC link voltage generating means 4 measures the voltage of the DC link voltage measuring unit 20 to thereby measure a DC link voltage VGC as a voltage between the terminals at both ends of the first DC link smoothing capacitor 17 installed in the converter unit 10.

In the first memory region 5, the capacity value of the first DC link smoothing capacitor 17 is prestored. In the second memory region 51, a capacity value of the second DC link smoothing capacitor 18 is prestored.

To vary a DC link low-voltage alarm detection level (hereinbelow, also simply called "low-voltage alarm detection level") which will be described later on the basis of the capacity value of the first DC link smoothing capacitor 17 and the capacity value of the second DC link smoothing capacitor 18 obtained from the first memory region 5 and the second memory region 51, the capacitor total capacity calculating means 6 calculates a total capacity value as a capacity value of sum of the capacity value of the first DC link smoothing capacitor 17 and the capacity value of the second DC link smoothing capacitor 18 and calculates the low-voltage alarm detection level on the basis of the calculated total capacity value.

The alarm generating means 7 compares the magnitude relation between the DC link voltage $V_{DC}$ detected by the DC link voltage detecting means 4 and predetermined low-voltage alarm detection level $V_A$ and, in the case where the DC link voltage $V_{DC}$ becomes equal to or less than the low-voltage alarm detection level $V_A$, generates an alarm.

The LV level setting means 8 sets the low-voltage alarm detection level $V_A$ as a criterion for the alarm generating means 7 to determine whether an alarm is generated or not. A method of setting the low-voltage alarm detection level $V_A$ will be described later.

Next, the operation procedure of the motor drive device according to the first embodiment will be described with reference to the flowchart of FIG. 6. First, in step S101, the capacitor total capacity calculating means 6 reads the capacity value of the first DC link smoothing capacitor 17 and the capacity value of the second DC link smoothing capacitor 18 from the first memory region 5 and the second memory region 51, respectively, and calculates a total capacity value as the sum of the read capacity values. The capacitor total capacity calculating means 6 calculates a DC link low-voltage alarm level for an instantaneous power failure on the basis of the calculated total capacity value and sets it.

In step S102, the DC link voltage detecting means 4 monitors the DC link voltage $V_{DC}$.

In step S103, the power supply voltage monitoring unit 3 monitors voltages of respective phases by measuring all of the AC voltages $V_R$, $V_S$, and $V_T$ which are output from the AC power supply 13 in the AC voltage measuring unit 19. In step S104, the power supply voltage monitoring unit 3 detects the presence or absence of a power failure in the AC power supply 13 on the basis of the result of monitoring the voltages of respective phases. In the case where no power failure is detected, the power supply voltage monitoring unit 3 returns to step S103 and continues monitoring the voltages of the respective phases. In the case where a power failure is detected, the power supply voltage monitoring unit 3 transmits power failure detection information indicative of detection of a power failure to the CPU 23.

In the case where the power supply voltage monitoring unit 3 detects a power failure, in step S105, the LV level setting means 8 changes the low-voltage alarm detection level. A method of changing the low-voltage alarm detection level will be described with reference to FIGS. 7A and 7B. The low-voltage alarm detection level is reference voltage for determining whether or not the decrease amount of the DC link voltage $V_{DC}$ of the converter unit 10 has reached a level at which the power element is influenced. That is, in the case where the DC link voltage $V_{DC}$ becomes equal to or less than the low-voltage alarm detection level, there is the possibility that large current flows in the power element. By monitoring the DC link voltage $V_{DC}$, the power element is prevented from being destroyed by large current.

The magnitude of inrush current varies depending on the decrease amount of the DC link voltage $V_{DC}$ and the total capacity of the DC link smoothing capacitors. Consequently, by paying attention to the decrease amount of the DC link voltage $V_{DC}$, a method of changing the low-voltage alarm detection level in each of the case where the decrease amount is large and the case where the decrease amount is small will be described.

The case where the decrease amount of the DC link voltage $V_{DC}$ is large will be described with reference to FIG. 7A. FIG. 7A illustrates changes with time in the DC link voltage $V_{DC}$ and the low-voltage alarm detection level. The horizontal axis indicates time [s] and the vertical axis indicates voltage [V]. In FIG. 7A, it is assumed that a power failure (instantaneous power failure) occurs in the period between time $t_0$ and $t_1$.

A DC link voltage before occurrence of the power failure is expressed as $V_{DC0}$, and a low-voltage alarm detection level before occurrence of the power failure is expressed as $V_{AN}$. The low-voltage alarm detection level $V_{AN}$ is set to a voltage lower than the DC link voltage $V_{DC0}$ only by the amount of a predetermined margin. When the margin is set as $V_{M0}$, $V_{M0}$ is expressed by the following equation.

$$V_{M0} = V_{DC0} - V_{AN} \quad (1)$$

In a state where no power failure occurs, it is rare that the DC link voltage $V_{DC}$ decreases. Consequently, the margin $V_{M0}$ can be set to be relatively large. That is, the low-voltage alarm detection level $V_{AN}$ before occurrence of a power failure can be set to be relatively small value.

When a power failure occurs at time $t_0$, the DC link voltage $V_{DC}$ decreases. The largest value of the decrease amount of the DC link voltage $V_{DC}$ is set as $V_{DCL}$. It is assumed that when the DC link voltage $V_{DC}$ decreases only by $V_{DCL}$, inrush current generated is large, and the power element in the converter unit 10 may be destroyed. In the present invention, after a power failure, the low-voltage alarm detection level is increased from $V_{AN}$ as the value before the power failure to $V_{AL}$. By generating an alarm when the DC link voltage $V_{DC}$ decreases to $V_{AL}$, destruction of the power element is prevented.

When a margin until the DC link voltage $V_{DC}$ reaches the low-voltage alarm detection level $V_{AL}$ after the power failure is set as $V_{M1}$, $V_{M1}$ can be expressed as the following equation.

$$V_{M1} = V_{DC} - V_{AL} \quad (2)$$

In the present invention, in the case where the power supply voltage monitoring unit 3 which monitors AC voltage of the AC power supply 13 detects a power failure, since the DC link low-voltage alarm detection level is increased according to the total capacity of the DC link smoothing capacitors, the following equation is satisfied.

$$V_{AL} > V_{AN} \quad (3)$$

From the equations (1) to (3), it is understood that $V_{M1} < V_{M0}$. That is, the margin voltage $V_{M1}$ until the DC link voltage $V_{DC}$ reaches the low-voltage alarm detection level $V_{AL}$ after the power failure is smaller than the margin voltage $V_{M0}$ until the DC link voltage $V_{DC}$ before occurrence of the power failure reaches the low-voltage alarm detection level $V_{AN}$ before the power failure. By increasing the low-voltage alarm detection level after the power failure from the low-voltage alarm detection level before the power failure as described above, the decrease amount of the DC link voltage can be detected before the decrease amount of the DC link voltage after the power failure reaches a level the inrush current by which the power element of the converter unit may be destroyed is generated. Consequently, even in the case of using the power element whose resistance to inrush current is not excessively high, destruction of the power element by inrush current which is generated by decrease in the DC link voltage can be prevented. As a result, the power element having proper margin can be selected.

Further, before occurrence of a power failure, the margin voltage $V_{M0}$ between the DC link voltage $V_{DC0}$ at the normal time and the low-voltage alarm level $V_{AN}$ can be set to be relatively large. Therefore, occurrence of a low-voltage alarm due to erroneous operation at the time of normal operation can be suppressed.

Next, a method of changing the low-voltage alarm detection level in the case where the decrease amount of the DC link voltage $V_{DC}$ is small will be described with reference to FIG. 7B. FIG. 7B illustrates changes with time in the DC link voltage $V_{DC}$ and the low-voltage alarm detection level. In FIG. 7B, it is assumed that a power failure (instantaneous power failure) occurs in the period between time $t_0$ and $t_1$. The DC link voltage $V_{DC0}$, the low-voltage alarm detection level $V_{AN}$, and the margin $V_{M0}$ before occurrence of a power failure are similar to those in the case where the decrease amount of the DC link voltage $V_{DC}$ is large.

When a power failure occurs at time $t_0$, the DC link voltage $V_{DC}$ decreases. The largest value of the decrease amount of the DC link voltage $V_{DC}$ is set as $V_{DCS}$. It is assumed that even when the DC link voltage $V_{DC}$ decreases only by $V_{DCS}$, inrush current generated is small, and the power element in the converter unit 10 is not destroyed. That is, even when the DC link voltage $V_{DC}$ decreases only by $V_{DCS}$ after a power failure, since it does not reach the low-voltage alarm detection level $V_{AL}$, it is unnecessary to generate an alarm.

In such a manner, in the present invention, the low-voltage alarm detection level is changed according to the total capacity of the DC link smoothing capacitors. Consequently, decrease in the DC link voltage by which the power element may be destroyed can be detected accurately, and the power element having a proper margin can be selected.

In step S106 in FIG. 6, the CPU 23 receives data of the measured DC link voltage $V_{DC}$ from the DC link voltage detecting means 4, and determines whether or not the DC link voltage $V_{DC}$ is equal to or less than the low-voltage alarm detection level $V_A$ changed by the LV level setting means 8.

In the case where the measured DC link voltage $V_{DC}$ is equal to or less than the low-voltage alarm detection level $V_A$, the DC link voltage has decreased more than expected. Since there is the possibility that the power element is influenced by large inrush current which is generated due to the decrease in the DC link current, an alarm is generated in step S107.

On the other hand, in the case where the measured DC link voltage $V_{DC}$ is not equal to or less than the low-voltage alarm detection level $V_A$, the program returns to the step S102 and the DC link voltage $V_{DC}$ is monitored.

After generation of an alarm, a system protecting operation is performed in step S108.

As described above, in the motor driving device according to the first embodiment, the low-voltage alarm detection level is varied so as not to destroy the power element by the inrush current after recovery from an instantaneous power failure, so that the proper power element can be selected.

Second Embodiment

A motor drive device according to a second embodiment will now be described. The motor drive device according to the second embodiment has a configuration similar to that of the first embodiment. In the motor drive device according to the second embodiment, the capacity information of the first DC link smoothing capacitor 17 in the converter unit 10 and the capacity information of the second DC link smoothing capacitor 18 in the inverter unit 30 are previously stored in the first memory region 5 in the converter unit 10 and the second memory region 51 in the inverter unit 30, respectively. In the case where units of arbitrary number are connected in parallel, total capacity which is the sum of the capacity of the first DC link smoothing capacitor 17 in the converter unit 10 and the capacity of the second DC link smoothing capacitor 18 in the inverter unit 30 is calculated by the CPU 23 inside the converter unit 10 using the first and second communication means 24 and 25 between the units, and a DC link low-voltage alarm detection level for an instantaneous power failure is determined.

Figure 8:
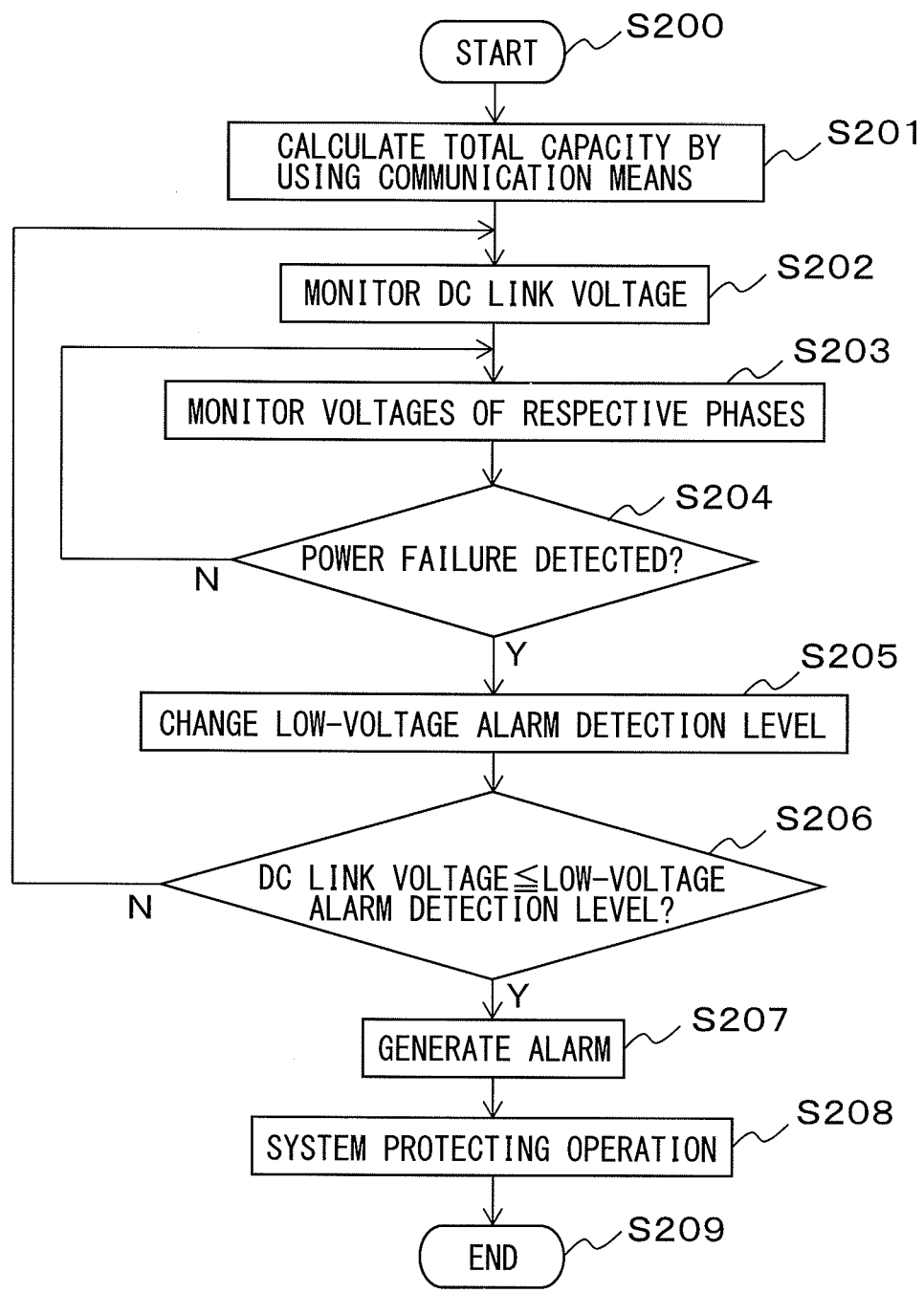
FIG. 8 is a flowchart illustrating the operation procedure of a motor drive device according to a second embodiment.

The operation procedure of the motor drive device according to the second embodiment will be described with reference to the drawing. FIG. 8 is a flowchart illustrating the operation procedure of the motor drive device according to the second embodiment. First, in step S201, using the first and second communication means 24 and 25 between the units, the capacity of the first DC link smoothing capacitor 17 in the converter unit 10 and the capacity of the second DC link smoothing capacitor 18 in the inverter unit 30 in each of a plurality of units connected in parallel are transferred to the CPU 23 in the converter unit 10. The CPU 23 calculates the total capacity as the sum of the capacity of the first DC link smoothing capacitor 17 and the capacity of the second DC link smoothing capacitor 18.

In step S202, the DC link voltage detecting means 4 monitors the DC link voltage. Since the operation procedure in steps S202 to S208 is similar to that in steps S102 to S108 of the first embodiment illustrated in FIG. 6, the detailed description will not be repeated.

In the motor drive device according to the second embodiment, in the case where a plurality of converter units and inverter units are connected in parallel by using the communication means, the total capacity of the DC link smoothing capacitors in the units is calculated by using the communication means. Therefore, the low-voltage alarm detection level can be set accurately, and the protection level of the power element can be set to a proper level.

Third Embodiment

Figure 9:
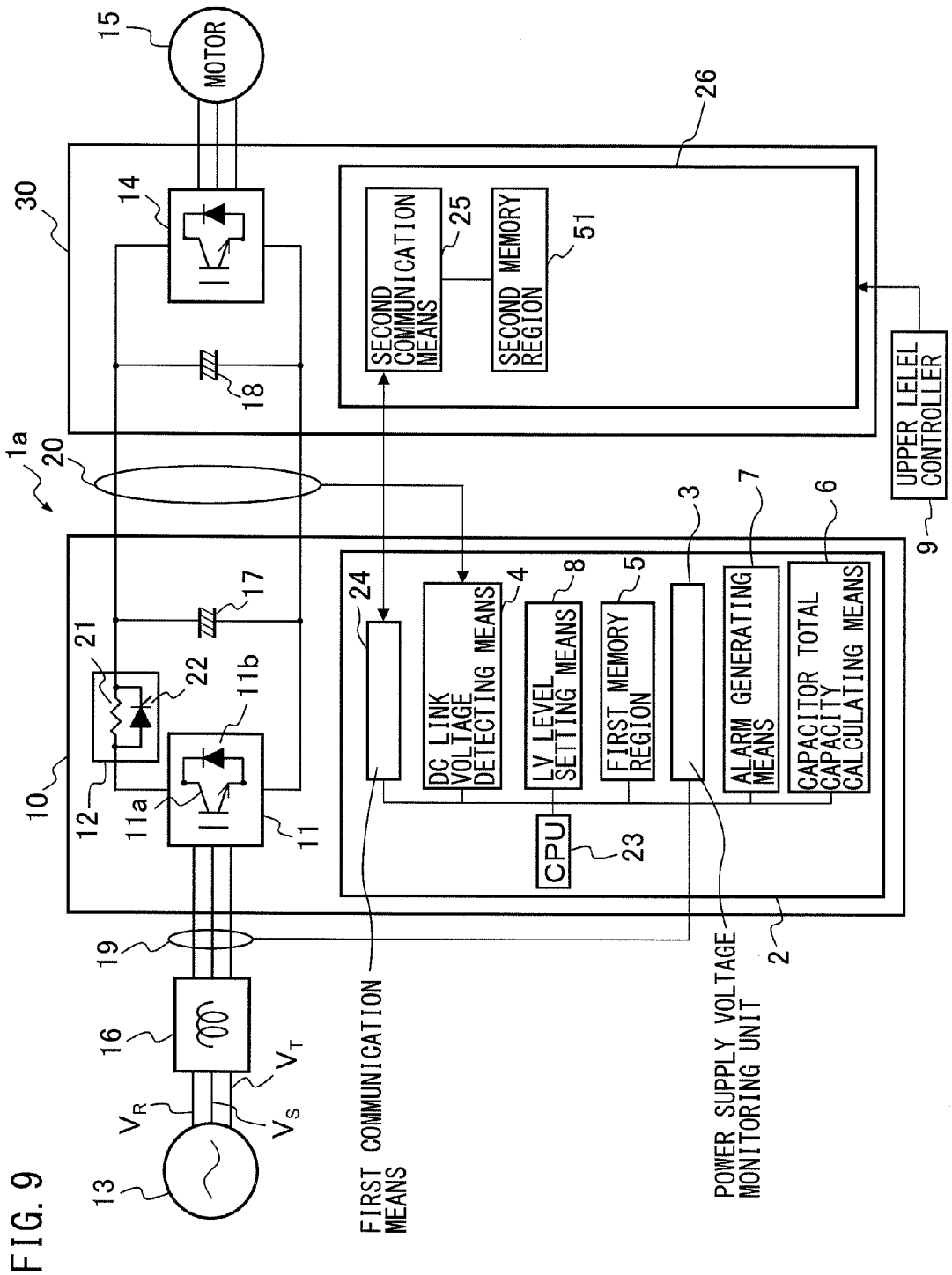
FIG. 9 is a diagram illustrating the configuration of a motor drive device according to the third embodiment.

Next, a motor drive device according to a third embodiment will be described. FIG. 9 is a diagram illustrating the configuration of a motor drive device 1a of the third embodiment. The same reference numerals are designated to the same components as those in the motor drive device 1 of the first embodiment. The motor drive device 1a of the third embodiment is different from the motor drive device 1 of the first embodiment with respect to the point that the total capacity of the first and second DC link smoothing capacitors 17 and 18 can be set as a control variable of a upper level controller 9 connected to the motor drive device 1a, and the DC link low-voltage alarm detection level for an instantaneous power failure is determined by using the set value. Since the other configuration is similar to that of the first embodiment, the detailed description will not be repeated.

The upper level controller 9 can supply the capacity values of the first and second DC link smoothing capacitors 17 and 18. Consequently, the low-voltage alarm detection level determined by the total capacity value can be arbitrarily set. For example, when the capacity values of the first and second DC link smoothing capacitors 17 and 18 change due to the influence of external environment or the like, by supplying the capacity values different from the capacity values stored in the first and second memory regions 5 and 51 from the upper level controller 9, the total capacity value of the DC link smoothing capacitors can be set. Alternatively, by supplying a capacity value different from the actual total capacity value, the low-voltage alarm detection level can be arbitrarily set.

The operation procedure of the motor drive device according to the third embodiment will be described with reference to the drawing. FIG. 10 is a flowchart illustrating the operation procedure of the motor drive device according to the third embodiment. First, in step S301, the capacity values of the first and second DC link smoothing capacitors 17 and 18 are supplied from the upper level controller 9.

In step S302, the DC link voltage detecting means 4 monitors the DC link voltage. Since the operation procedure in steps S302 to S308 except for step S305 is similar to that in steps S102 to S108 of the first embodiment illustrated in FIG. 6, the detailed description will not be repeated.

In step S305, the LV voltage setting means 8 sets a low-level alarm detection level on the basis of the supplied capacity values of the first and second DC link smoothing capacitors 17 and 18 in place of the capacity values stored in the first and second memory regions 5 and 51. The procedure of setting a low-voltage alarm detection level from the supplied capacity values of the first and second DC link smoothing capacitors 17 and 18 is similar to that of the first embodiment.

In the motor drive device according to the third embodiment, the total capacity value of the DC link smoothing capacitors can be set arbitrarily by the upper level controller. Consequently, the low-voltage alarm detection level can be set arbitrarily, and the protection level of the power element can be set to an arbitrary level.

Fourth Embodiment

A motor drive device according to a fourth embodiment will be described. The motor drive device according to the fourth embodiment has the function of calculating the total capacity of the first and second DC link smoothing capacitors 17 and 18 by a time constant of a pre-charging circuit for precharging the motor drive device, and determining the DC link low-voltage alarm detection level for an instantaneous power failure. The configuration of the motor drive device of the fourth embodiment is similar to that of the motor drive device 1 of the first embodiment.

In the motor drive device according to the fourth embodiment, the converter unit 10 has a parallel circuit 12 having a resistor 21 and a thyristor 22 (refer to FIG. 5). A closed circuit is constructed by the resistor 21 together with the first and second DC link smoothing capacitors 17 and 18 and serves as a pre-charging circuit. From the time constant of the closed circuit, the total capacity of the first and second DC link smoothing capacitors 17 and 18 can be calculated. Since it is presumed that the capacity value calculated in such a manner reflects the characteristic of the actual elements, an accurate capacity value can be calculated. On the basis of such a capacity value, the low-voltage alarm detection level can be properly calculated.

The operation procedure of the motor drive device according to the fourth embodiment will be described with reference to the drawing. FIG. 11 is a flowchart illustrating the operation procedure of the motor drive device according to the fourth embodiment. First, in step S401, the capacity value is calculated by the time constant of a pre-charging circuit for precharging the motor drive device, that is, the time constant of the closed circuit constructed by the resistor 21 and the first and second DC link smoothing capacitors 17 and 18.

In step S402, the DC link voltage detecting means 4 monitors the DC link voltage. Since the operation procedure in steps S402 to S408 is similar to that in steps S102 to S108 of the first embodiment illustrated in FIG. 6, the detailed description will not be repeated.

In the motor drive device according to the fourth embodiment, the total capacity value of the DC link smoothing capacitors is calculated by using the closed circuit made by the resistor and the DC link smoothing capacitors. Consequently, the low-voltage alarm detection level can be set by using the actual capacity values of the DC link smoothing capacitors, and the protection level of the power element can be set to a level adapted to the characteristics of the actual DC link smoothing capacitors.

In the foregoing embodiments, the case of generating an alarm when the DC link voltage becomes equal to or less than the low-voltage alarm detection level has been described. Together with generation of an alarm or in place of generation of an alarm, the motor drive device may be forcedly stopped by a switch or the like (not illustrated). It is also possible to insert an auxiliary circuit or the like (not illustrated) on the input power supply side and perform precharging operation at the time of recovery of the power supply.

What is claimed is:

1. A motor drive device including a converter unit for converting AC power of an AC power supply to DC power and an inverter unit for converting the DC power converted by the converter unit to variable-frequency AC power, wherein the converter unit comprises:
 a power supply voltage monitoring unit for monitoring voltages of respective phases of the AC power supply to detect a power failure;
 DC link voltage detecting means which detects low voltage by monitoring DC link voltage;
 capacitor total capacity calculating means which calculates total capacity of DC link smoothing capacitors provided for the converter unit and the inverter unit;
 DC link low-voltage alarm detection level setting means which varies a DC link low-voltage alarm detection level for an instantaneous power failure as necessary; and
 alarm generating means which monitors the DC link voltage and, in the case where the DC link voltage kills below the DC link low-voltage alarm detection level, generates an alarm to protect the converter unit, and
wherein when the power supply voltage monitoring unit of the AC power supply detects the power failure, the DC link low-voltage alarm detection level is increased in accordance with the total capacity of the DC link smoothing capacitors.

2. The motor drive device according to claim 1, wherein the capacity information of the DC link smoothing capacitor in the converter unit and the capacity information of the DC link smoothing capacitor in the inverter unit are previously stored in a memory region in the converter unit and a memory region in the inverter unit, respectively,
 in the case where units of arbitrary number are connected in parallel, total capacity of the DC link smoothing capacitors provided in the converter unit and the inverter unit are calculated. by a CPU in the converter unit by using communication means between the units, and the DC link low-voltage alarm detection level for the instantaneous power failure is determined.

3. The motor drive device according to claim 1, wherein the total capacity of the DC link smoothing capacitors can be set as a control variable of an upper level controller connected to the motor drive device, and the DC link low-voltage alarm detection level for the instantaneous power failure is determined by using the set value.

4. The motor drive device according to claim 1,
 wherein the converter unit has a parallel circuit having a resistor and a thyristor,
 wherein a closed circuit is provided by the resistor together with the DC link smoothing capacitors provided for the converter unit and the inverter unit serving as a pre-charging circuit, and
 wherein the total capacity of the DC link smoothing capacitors is calculated on the basis of a time constant of a pre-charging circuit for pre-charging the motor drive device, and the DC link low-voltage alarm detection level for the instantaneous power failure is determined.

* * * * *